Figure 1:
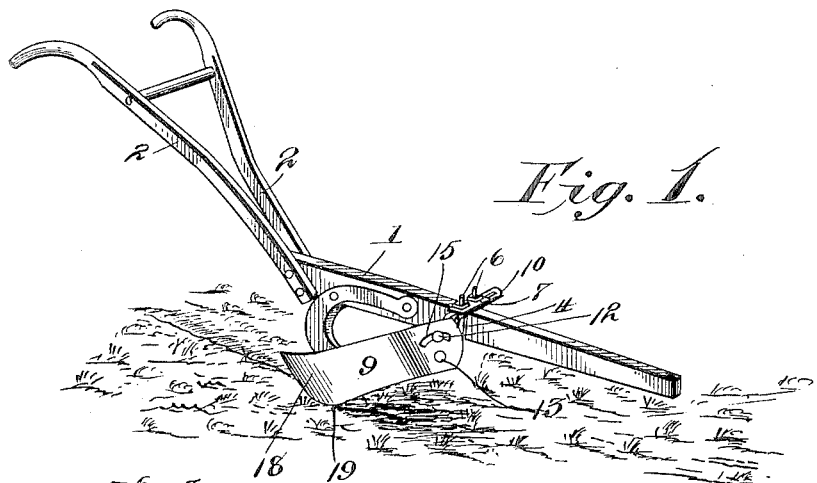

No. 640,444. Patented Jan. 2, 1900.
E. M. COLBERT.
PLOW FENDER.
(Application filed Sept. 20, 1899.)

(No Model.)

Witnesses
Clarence H. Walker,
Chas. S. Hyer.

E. M. Colbert, Inventor
By his Attorneys,
C. A. Snow & Co.

THE NORRIS PETERS CO., PHOTO-LITHO., WASHINGTON, D. C.

UNITED STATES PATENT OFFICE.

ELISHA M. COLBERT, OF LAFAYETTE, GEORGIA.

PLOW-FENDER.

SPECIFICATION forming part of Letters Patent No. 640,444, dated January 2, 1900.

Application filed September 20, 1899. Serial No. 731,076. (No model.)

*To all whom it may concern:*

Be it known that I, ELISHA M. COLBERT, a citizen of the United States, residing at Lafayette, in the county of Walker and State of Georgia, have invented a new and useful Plow-Fender, of which the following is a specification.

This invention relates to plow-fenders; and the object of the same is to provide simple, efficient, and compact means by which the more friable earth is pressed or thrown up to the plants, while clods, stones, and other larger similar masses are thrown into the furrow behind the share or plow, the improved fender being of such form also as to cut the grass or other growth and clear the same from injurious proximity to the plants.

One advantage of the present form of implement is that it can be worked much nearer the hills than an unguarded shovel and saves the necessity of the usual going over to restore crushed and displaced plants, a service often in a busy season neglected until too late.

Other objects and advantages will appear in the subjoined description and be hereinafter claimed, an embodiment of the invention being illustrated in the accompanying drawings and susceptible of changes in the form, size, and minor details of construction within the scope of the invention, and wherein similar reference characters are employed to indicate corresponding parts in the several views, and in which—

Figure 2:
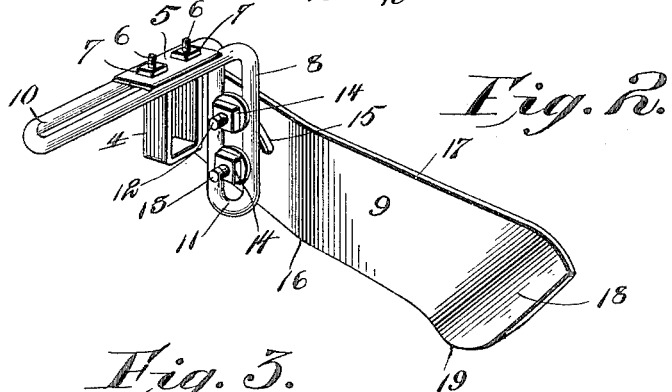
Figure 3:
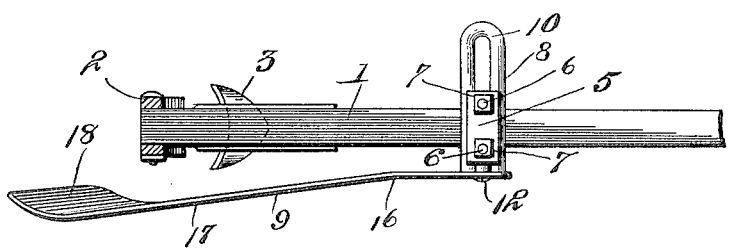

Figure 1 is a perspective view of a plow, showing the improved fender applied in operative position thereon. Fig. 2 is a detail perspective view of the fender and the attachment thereof. Fig. 3 is a top plan view of a plow with the handles cut off and also the fender and the attaching device.

The numeral 1 designates a plow-beam, which may be of any preferred form of construction and supplied with suitable handles 2 and a plow 3, which in the present instance is of the single-shovel form. The plow proper may be varied at will, however, and in some instances the improved device may be advantageously used in connection with multiple cultivators or even with a turning-plow, though more particularly adapted to shovel-plows.

The improved device comprises a cuff 4, which is adapted to be moved longitudinally over the beam 1 and tightly held in an adjusted position through the medium of a clamping-plate 5, having apertures therein for the passage therethrough of the screw-threaded terminals 6 of said cuff, which receive nuts 7 to hold the said parts in firm clamping relation. An angle-arm 8 is employed to hold the fender 9 in connection with the plow, said arm comprising a horizontal member 10 and vertical member 11. The arm is preferably formed of rounded bar metal constructed as an elongated loop and bent intermediate its length to dispose the members 10 and 11 in a plane at right angles to each other. The horizontal member 10 is longer than the vertical member 11, and the screw-threaded terminals 6 of the cuff 4 freely extend between the opposite parallel parts of the horizontal member 10 and hold the clamping-plate 5 immovable thereon, and by this means the said member 10 is firmly fastened or secured in an adjustable condition transversely on the upper edge of the beam 1. By loosening the nuts 7 and releasing the clamping-plate 5 the horizontal member 10 may be drawn outwardly from the beam to position the fender a greater distance from the plow 3 or be moved inwardly over the said beam to bring in the fender closer to the said plow, and an extreme or intermediate adjustment in either direction will be maintained by an after-tightening of the said nuts.

The fender 9 is held in firm connection with the vertical member 11 of the arm 8 by two bolts 12 and 13, which are supplied with nuts and washers 14, the said bolts extending between the opposite parallel parts of the vertical member 11, and the fender may be raised or lowered within the limits of the said member by loosening the said nuts on the bolts 12 and 13. The fender 9 also has a further adjustment in the arc of a circle and for this purpose is formed with a segmental slot 15, through which the bolt 12 extends, the heads of both bolts 12 and 13 being against the outer side of the attached end of the fender. In this adjustment of the fender in the arc of a circle the bolt 13 serves as a fulcrum, and the depth of penetration of the plow can by this means be readily accommodated, or the trailing end of the fender may be caused to cut deeper into the earth.

The fender near its attached end is bent, as at 16, to provide a rear deflection 17 thereof to cause it to stand obliquely in the line of the beam 1, and the rear extremity of this deflected portion of the fender is curved inwardly, as at 18, and formed with a lower rounded cutting-corner 19, the cutting edge extending up over the entire rear end of the said inwardly-curved extremity.

When the fender is applied and adjusted for ordinary work, it is arranded as shown in Fig. 1, so that the lower rounded corner 19 will bear upon the earth, the angle of the said fender being variable through the medium of the slot 15. As the plow is drawn forwardly the grass, weeds, and other growth are cut away from the young plants and pulled down and either fed to the furrow in rear of the plow by the inturned extremity 18 or pushed away from choking proximity to the said plants. The more friable earth is pushed up about the plants along the sides of the hill, and through the medium of the inturned extremity 18 stones, clods, and heavier masses are directed into the furrow in rear of the plow, and thereby free the plants from the incumbrance, which would obstruct the successful propagation of said plants.

The parts of the improved fender will be constructed of suitable material best adapted to serve the purpose, and the fender may be arranged on either the right or left hand side of the plow, such changes as fully fall within the scope of the invention being made to permit this change of position. The attachment is light, strong, and durable, and when its use is undesirable it can be easily disconnected and may be afterward as readily applied. The application of the improved device does not demand any particular structure of plow or a modification in the ordinary form of beam and owing to its simplicity can be manufactured at a very small cost.

Having thus described the invention, what is claimed as new is—

The combination with a plow, of an arm having a horizontal member and a vertical member, a cuff for the plow-beam connected to the horizontal member, and a fender attached to the vertical member of said arm and capable of having a vertical adjustment without varying its angle and a further independent adjustment in the arc of a circle, the said fender being intermediately bent to provide an outward deflection of the rear part thereof, the rear extremity of the lower part of said deflected portion being inturned and provided with a cutting edge.

In testimony that I claim the foregoing as my own I have hereto affixed my signature in the presence of two witnesses.

ELISHA M. COLBERT.

Witnesses:
JNO. C. KNOX,
P. G. SMALLWOOD.